2,817,808

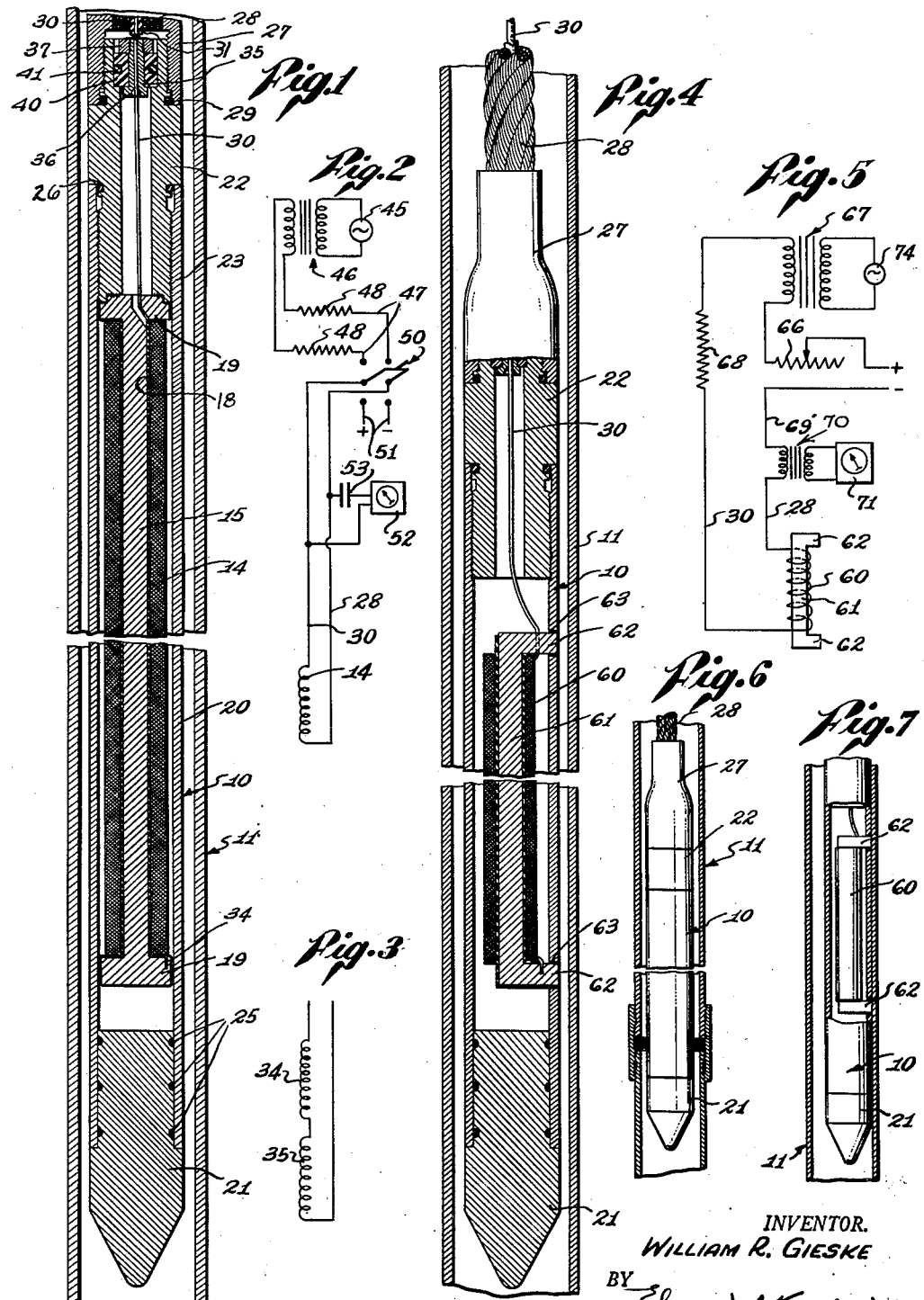
Dec. 24, 1957     W. R. GIESKE     2,817,808
METHOD OF AND APPARATUS FOR LOCATING STUCK PIPE IN WELLS
Filed March 6, 1951
INVENTOR.
WILLIAM R. GIESKE United States Patent Office 2,817,808
Patented Dec. 24, 1957

METHOD OF AND APPARATUS FOR LOCATING STUCK PIPE IN WELLS

William R. Gieske, Whittier, Calif., assignor to Dia-Log Tubular Survey Company, Whittier, Calif., a partnership Application March 6, 1951, Serial No. 214,086

4 Claims. (Cl. 324—34)

My invention relates to methods and devices employed for ascertaining data about pipe in a well and especially for locating the point at which a pipe is stuck in a well, the term pipe including oil well casing, tubing and the like. The invention relates specifically to procedures that involve applying force to stress the pipe above the stuck point and testing the pipe at various levels for yield to the stress, the stuck point being at the level where the pipe ceases to yield.

The general object of the invention is to provide a simple but highly sensitive detecting device together with a simple procedure that may be used not only to find the level of the stuck point but also to locate the nearest coupling above the stuck point.

Several devices and techniques have been suggested heretofore for ascertaining whether or not a pipe yields at various levels in a well in response to stress applied to the upper end of the pipe. In general the successful devices heretofore developed require anchorage to the surrounding pipe at one or more points, usually two points and have relatively movable parts that respond to local yielding movement of the pipe.

Inaccurate results in the actual use of such devices arise from failure to make effective anchorage engagement with the pipe, failure to transmit the yielding movement of the pipe to the relatively movable parts of the detecting device, failure to pre-set the relatively movable parts of the detecting device accurately in preparation for a test, and, finally, failure to detect such relative movement as may occur between the parts. It is apparent that these causes for failure can be highly troublesome and necessarily lead to complications in the structure and functioning of the test devices.

In contrast, the device of the present invention does not depend on actual measurement or direct detection of the yielding movement of the pipe material nor does it require actual anchoring engagement with the pipe. Moreover, the invention does not have relatively movable parts nor, in fact, any movable parts whatsoever.

This ultimate in simplicity depends upon the fact that the stressing of a piece of magnetic material such as a section of pipe reduces its permeability to magnetic flux. The change in permeability is detected simply by using a suitable inductor inside the pipe that is magnetically linked with the pipe and noting whether or not stressing or unstressing of the pipe above the test level causes a responsive change in the flow of alternating or fluctuating current through the inductor circuit.

If the test is made at any level above the stuck point of the pipe, the stressing of the pipe either in tension or in torque will cause a shift or redistribution of the magnetic field of the inductor since much of the field is concentrated in the surrounding pipe. The consequent change in impedance will manifest in change in current flow in the inductor circuit and the current change may be easily detected at any distance from the inductor. Such an arrangement affords higher sensitivity to pipe stress than heretofore attained.

An important feature of the invention is that the device used to detect stress in the pipe may also be used o locate joints in the pipe. The operator can easily and quickly make sure that the test for yield to stress is made where it should be made at an intermediate point in a section of pipe.

This ability of the test inductor to detect pipe joints opens up new possibility in dealing with the problem of stuck pipe. For example, the device can be used to count the pipe joints as it is lowered into the well instead of measuring actual footage to the test levels. The counting of the pipe joints can be made automatic by using a suitable counting device responsive to the inductor circuit or the indications of the pipe joints on the part of the inductor circuit can be recorded, for example, on a moving record tape by means of a pen controlled by the inductor circuit.

Accurate pipe joint detection also makes it possible to locate the first joint in the pipe above the stuck point and to lower an explosive charge to the precise level of that joint. The pipe above the stuck joint may be disconnected for withdrawal from the well by applying torque to the pipe in a direction to unscrew the pipe and then using an explosive to jar the particular pipe joint at which the unscrewing action is desired.

The invention obviously has other uses in a well that depend upon responsiveness to the presence of metal or responsiveness to changes in configuration of the metal.

The above and other objects and advantages of the invention will be understood from the following detailed description taken with the accompanying drawings.

In the drawings, which are to be regarded as merely illustrative:

Fig. 1 is a longitudinal section of one form of the invention;

Fig. 2 is a wiring diagram of the circuits employed with the device shown in Fig. 1;

Fig. 3 shows diagrammatically how the device shown in Fig. 1 may be modified by using two inductors in series instead of a single inductor;

Fig. 4 is a sectional view similar to Fig. 1 showing another form of the invention;

Fig. 5 is a wiring diagram of a circuit arrangement that may be used with the device shown in Fig. 4;

Fig. 6 shows on a smaller scale a side elevation of a device that may be taken as any one of the three forms of the invention, the device being in the region of a pipe joint with the pipe shown in section; and, Fig. 7 is a similar view showing the third form of the device in a well pipe, parts of the device being broken away to reveal its structure;

Fig. 1 shows a device or detector unit, generally designated 10, constructed in accord with my invention, the device being shown inside a well pipe, generally designated 11. The essential element of the detector device 10 is an inductor 14 which by preference is a multiple-layer helical coil with its axis parallel with the axis of the well pipe 11 and is provided with an open iron core 15. In the particular construction shown, the inductor or coil 14 is wound directly on the core 15 with a suitable intervening insulating layer 18 and the core has the configuration of a spool since it has enlarged poles 19.

Preferably, but not necessarily, the inductor 14 is mounted in a tubular housing 20 of non-magnetic material, such as non-magnetic stainless steel. In the construction shown, the housing 20 is a tube with a solid nose 21 plugging its lower end and a special nipple 22 closing its upper end. The core 15 is attached to the lower end of the nipple 22 by silver solder as indicated at 23. The lower end of the housing 20 is secured to the nose 21 and at the same time sealed by silver solder as shown at 25 and the upper end is threaded onto the nipple 22 and sealed by a suitable gasket 26. The nipple 22 is shown threaded in turn into a socket 27 at the end of a cable 28, this joint being sealed by a second gasket 29.

One side of the circuit for energizing the inductor 14 is grounded and includes the cable 28, the cable socket 27, the nipple 22 and the iron core 15. The other side of the circuit includes a conductor 30 that is encased by insulation 31 inside the cable 28. The conductor 30 is connected to the upper end of the inductor 14 and the lower end of the inductor is connected in turn to the core 15 as indicated at 34 to complete the circuit.

The entrance of the conductor 30 into the housing 20 may be sealed in any suitable manner. In the preferred arrangement shown in Fig. 1 the conductor 30 extends in a fluid-tight manner through a suitable bushing 35 that is formed with a head 36 at its inner end and is threaded at its outer end to receive a nut 37. Confined between the head 36 and the nut 27 is a suitable sleeve 40 of waterproof non-conducting material, preferably a suitable plastic. The sleeve 40 embraces the bushing 35 in a fluid-tight manner under compression by the nut 37 and has a circumferential recess in which is mounted a suitable sealing gasket 41.

The described detector unit may be used either for locating joints in well pipe or for detecting stress in the pipe and both of these functions are utilized in the present method of locating a point at which the well pipe is stuck.

The function of the device as a means for detecting or locating pipe joints depends upon the fact that movement of the inductor 14 through a pipe joint changes the magnetic linkage of the inductor both because of the discontinuity of the metal at the joint and because the pipe coupling changes the configuration of the pipe structure at the joint. The consequent change in the impedance of the circuit causes current flow to vary in a characteristic manner that is easily recognized as caused by a joint in the pipe structure. For this task the moving inductor may be energized with either direct current or alternating current, for example, 10 volt direct current or 20 volt alternating current.

For the purpose of ascertaining whether or not the surrounding pipe 11 is stressed, the inductor 14 is held stationary in the pipe 11 and the inductor 14 is energized with a suitable current that varies continually in a predetermined cyclic manner. Either alternating current or fluctuating direct current may be used. Alternating current of 100 or more volts is suggested.

Fig. 2 is a wiring diagram showing how the detector unit 10 may be used in the preferred practice of the invention. A suitable oscillator 45 is connected to the primary side of a transformer 46. The transformer 46 delivers 60 cycle 250 volt current to a pair of wires 47 that are connected through a corresponding pair of 500 ohm resistors 48 to a pair of contacts in a switch generally designated 50.

The switch 50 is a double-throw double-pole switch, the blades of which in one limit position close an alternating current circuit through the two wires 47 and in its other limit position close a circuit through a pair of wires 51 from a source of 10 volt direct current. The two blades of the switch 50 are connected respectively to the previously-mentioned cable 28 and the conductor 30 inside the cable.

Any suitable means known to the art, including various bridge circuits, may be employed to detect or indicate changes of current flow through the inductor circuit arising from changes in the magnetic linkage between the inductor 14 and the surrounding pipe structure 11. In the arrangement, shown by way of example in Fig. 2, a microvoltmeter 52 is connected across the two sides of the inductor circuit with a condenser 53 interposed to block direct current.

The manner in which the invention shown in Figs. 1 and 2 is operated may be readily understood from the foregoing description. The detector unit may be lowered to any predetermined level either by measuring the footage of the cable 28 or by counting the pipe joints as indicated by the needle of the microvoltmeter 52 as the energized inductor 14 is moved through the well pipe.

With the detector unit stationary at a selected level to ascertain whether or not the surrounding pipe is above the point at which the pipe is stuck in the well, the switch 50 is positioned to energize the inductor 14 with the 250 volt alternating current and comparison is made between the reading of the microvoltmeter 52 when the upper end of the well pipe is stressed and the reading of the microvoltmeter when the pipe is free from such stress.

In practice the comparison is made simply by noting whether or not the needle of the microvoltmeter 52 responds when the stress is applied or released. Thus, with the inductor 14 energized by the alternating current the upper end of the well pipe 11 is stressed either in tension or in torque and the microvoltmeter is carefully observed for response. If the needle of the microvoltmeter fluctuates when the stress is applied or released, the operator may deduce that the surrounding pipe responds to the stress applied at the top of the well and therefore the level at which the test is made is above the level at which the pipe is stuck.

It will be readily appreciated that the inductor 14 may be made in various shapes and dimensions so long as it creates a magnetic field that links with the surrounding pipe structure 11. The described inductor 14 is preferably approximately 17 inches long and has seven wraps or layers of 24-gauge cotton-covered wire.

Since such a long inductor is substantially longer than a coupling in the largest size of pipe that is to be tested, it will produce relatively prolonged signals when passing through couplings or pipe joints and therefore may be lowered rapidly through a joint without unduly shortening the indicating signal. Even when the detector passes at high speed through the relatively short coupling in a small diameter pipe, as shown in Fig. 6, the signal will be prolonged to make detection of the joint certain.

It is desirable, of course, to make all of the tests for stress in the well pipe at points between the pipe joints so that the response of the microvoltmeter needle will always follow substantially the same pattern of movement. In the usual test procedure there is no way of making sure that the selected test level is at an intermediate point in a section of pipe instead of at a joint in the pipe. In using the present device however, it is possible to find out if it is at or near a pipe joint simply by moving the inductor up and down while observing the needle of the microvoltmeter 52. If the needle does not respond to reciprocation of the inductor over a path, say approximately 30 inches long, it can be safely assumed that the inductor is at a level spaced away from the nearest pipe joint.

It is not desirable to make the inductor 14 unduly long for the sake of prolonging the indication of the pipe joint because increase in length means greater distributed capacity among the turns of the coil and greater distributed capacity between the inductor core 15 and the surrounding pipe structure. Such increase in distributed capacity increases losses in the circuit. The signal generated by the movement of the detector through a pipe joint may be prolonged, however, without undue losses and without sacrificing sensitivity or signal strength simply by using a plurality of inductors in series. Thus, Fig. 3 indicates how two inductors 34 of the same character and size as the inductors 14 may be placed in series to make a composite inductor twice as long as the inductor of Fig. 1.

With further reference to Fig. 3, it may be noted that the Q of the circuit should be as high as possible for maximum efficiency. The Q of the circuit in Fig. 3 with two coils in series is higher than the Q of a similar circuit with only one coil.

The third form of the invention shown in Fig. 4 is in most respects identical in construction with the previously-described embodiment shown in Fig. 1 as indicated by the use of corresponding numerals to indicate corresponding parts. The inductor or coil 60 may be of substantially the same character and dimensions as heretofore specified but in this instance the coil is wound on a U-shaped core 61 that has its poles 62 turned to one side for the purpose of drawing the detector into close contact with the surrounding pipe structure 11. Preferably the poles 62 are exposed for actual contact with the pipe structure 11 and therefore extend through suitable apertures in the detector housing 20, the construction being made fluid-tight by silver solder 63 around the poles.

The fact that the poles 62 actually touch the well pipe is an outstanding advantage. The practically complete elimination of air gaps at the poles minimizes losses and greatly increases the sensitivity of the detector unit.

This third form of the invention may be employed with circuits such as shown in the wiring diagram in Fig. 5. One side of a suitable source of 100 volt direct current is connected to a variable resistor 66 which is in series with the secondary coil of a transformer 67. The transformer is connected through a suitable resistance 68 to the previously-mentioned conductor 30 in the cable 28. The other side of the direct current source is connected by a wire 69 with a transformer 70 that serves as inductance coupling for making a microvoltmeter 71 responsive to changes of current in the circuit. The circuit is completed by connecting the transformer 70 with the cable 28.

The purpose of the first-mentioned transformer 67 is to permit a suitable oscillator 74 to introduce low voltage alternating current into the circuit, for example 20 volt alternating current. The 20 volt alternating current may be the sole current energizing the inductor 60 or may be introduced for the purpose of modulating the 100 volt direct current to produce fluctuating direct current in the inductor 60.

Since relatively heavy current through the inductor 60 will tend to make the detector unit cling to the side of the surrounding pipe structure, only relatively weak current is supplied to the inductor 60 for response to pipe joints as the inductor moves through the well pipe. For this purpose, the inductor 60 may be energized either by 20 volt alternating current from the transformer 67 or may be energized by direct current at, say 10 volts, the voltage of the direct current being reduced to this magnitude by adjustment of the variable resistor 66.

When the detector shown in Fig. 4 has been lowered to a level at which a stress test is to be made and it has been ascertained by actual tests that the inductor is out of the range of the pipe joint, the inductor 60 is energized with 100 volt direct current to pull the poles 62 of the inductor into close contact with the surrounding pipe 11 as shown in Fig. 7.

A feature of this particular form of the invention is that when the two poles of the inductor 60 are in complete contact with the metal of a pipe of a given size, the microvoltmeter 71 will give a characteristic reading. Thus, a glance at the needle of the microvoltmeter 71 will indicate whether or not the poles of the core 61 actually press against the metal of the surrounding pipe for maximum flux linkage with the pipe.

If the reading of the microvoltmeter 71 indicates that the well mud or other material lies between the poles and the pipe, the operator may drag the detector unit a few inches while the inductor 60 is heavily energized, and, if necessary, may de-energize the inductor so that the unit may be lowered for repeating the dragging action. Such dragging action tends to dislodge or displace intervening material to bring the poles of the inductor coil into intimate contact with the metal of the surrounding pipe. This ability of the third form of the invention to work its way into close contact with the pipe is an important feature.

A further feature of this form of the invention is the use of direct current primarily for electromagnetic attraction into contact with the well pipe with 20 volt. A. C. modulation for the purpose of detecting differences in impedance.

When the stuck point of a string of pipe in a well has been ascertained by making exploratory tests to find at which level the pipe ceases to yield to applied stress, it may be desirable to unscrew the free portion of the pipe as close as possible to the stuck point so that the free portion may be withdrawn from the well. It has been found possible to cause a pipe in a well to unscrew at a selected joint by jarring the joint, for example with an explosive charge, while the pipe is under a torque in the direction to unscrew the joint.

To carry out this last procedure successfully, it is necessary to place the explosive charge precisely at the selected pipe joint. The present invention makes such accurate placing of the explosive a simple matter. Once the stuck point of the pipe is located, the detector unit is raised from that level while energized to find the precise location of the first pipe joint above the stuck point. The level of the pipe joint may be ascertained from the footage of the cable 28 for guidance in lowering the explosive charge into place.

Other specific uses may be found for the invention. For example, a considerable length of pipe may be lodged in a key seat spaced away from the well bore on the inner side of a bend in the bore. Conventional devices lowered through the bore would by-pass such pipe without giving any clue. The present invention, however, would detect the pipe magnetically notwithstanding the fact that the pipe lies entirely outside the well bore proper.

My disclosure in specific detail of selected forms of the invention for the purpose of disclosure and to illustrate the principles involved will suggest to those skilled in the art various changes and substitutions that properly lie within the scope of the appended claims.

I claim:

1. In a device for locating a point at which a pipe is stuck in a well, the combination of: an inductor adapted for lowering in the pipe, said inductor having an open iron core shaped and dimensioned for magnetic linkage with the surrounding pipe; a circuit connected with said inductor; means to energize said circuit with direct current and alternating current selectively to permit the circuit to be energized with direct current while the inductor is moving in said pipe and to permit the inductor to be energized with alternating current while the inductor is stationary in the pipe; and an indicator responsive to changes in current flow through said inductor thereby to respond to changes in the magnetic linkage of the inductor with the surrounding pipe.

2. The invention as defined in claim 1, wherein said means to energize said circuit includes a double-poled, double-throw switch, a direct-current potential source and an alternating current potential source, said double-poled, double-throw switch being adapted to connect one of said sources to said circuit selectively.

3. In a device for locating a point at which a pipe is stuck in a well, the combination of: an electromagnet for lowering inside the pipe, said electromagnet having an open iron core for magnetic linkage with the surrounding pipe, the poles of said core being directed to one side to cause the electromagnet to be attracted to one side of the pipe; a circuit connected with said electromagnet; means to energize said circuit with continually and regularly varying current of constant average strength of sufficient magnitude to attract the electromagnet into engagement with one side of the pipe and of creating inductance; an indicator responsive to changes in current flow through said electromagnet, the poles of said core being exposed through the wall of the housing for physical contact with the surrounding pipe; and means to provide a fluid tight seal around the poles of said iron core, said housing also being fluid tight.

4. A method of locating a point at which a pipe is stuck in a well, including the steps of: lowering an electromagnet into the pipe to a level selected for a test; energizing the electromagnet with relatively weak current while lifting and lowering the electromagnet in the region of the selected area to obtain fluctuations of the current indicative of movement of the electromagnet past pipe joints, whereby to find a test point spaced away from pipe joints; positioning said electromagnet at said test point; energizing the electromagnet at said test point with fluctuating current of constant frequency and constant average strength; applying force to the pipe at the top of the well while the electromagnet at said test point is energized with the fluctuating current to obtain change in the current for detection in the event the selected test point is above the point at which the pipe is stuck, and measuring the fluctuating current due to stress in the pipe the fluctuating current energizing the electromagnet at said test point being of sufficient strength to attract the electromagnet to magnetic adherence to the pipe at the test point to obviate the necessity for high testing current.

References Cited in the file of this patent
UNITED STATES PATENTS

| | | |
|---|---|---|
| 2,078,426 | Sweet | Apr. 27, 1937 |
| 2,228,294 | Wurzbach | Jan. 14, 1941 |
| 2,228,623 | Ennis | Jan. 14, 1941 |
| 2,246,542 | Smith | June 24, 1941 |
| 2,250,703 | Crites et al. | July 29, 1941 |
| 2,305,261 | Kinley | Dec. 15, 1942 |
| 2,470,828 | Millington et al. | May 24, 1949 |
| 2,472,319 | Turner | June 7, 1949 |
| 2,530,308 | Martin | Nov. 14, 1950 |
| 2,540,589 | Long | Feb. 6, 1951 |
| 2,558,427 | Fagan | June 26, 1951 |